(12) United States Patent
Koeppen et al.

(10) Patent No.: US 8,284,489 B2
(45) Date of Patent: Oct. 9, 2012

(54) SPECTRALLY ADJUSTABLE FILTER

(75) Inventors: Christopher S. Koeppen, Clinton, NJ (US); Steven E. Parks, Mertztown, PA (US)

(73) Assignees: Aegis Lightwave, Inc., Woburn, MA (US); CardinalPoint Optics, Inc., Clinton, NJ (US)

( * ) Notice: Subject to any disclaimer, the term of this patent is extended or adjusted under 35 U.S.C. 154(b) by 1152 days.

(21) Appl. No.: 11/853,665

(22) Filed: Sep. 11, 2007

(65) Prior Publication Data
US 2009/0067054 A1    Mar. 12, 2009

(51) Int. Cl.
G02B 27/44    (2006.01)

(52) U.S. Cl. .............................. 359/566; 385/37; 398/87

(58) Field of Classification Search .................. None
See application file for complete search history.

(56) References Cited

U.S. PATENT DOCUMENTS

| | | | |
|---|---|---|---|
| 2,723,589 A | 11/1955 | Bullock | |
| 5,319,668 A | 6/1994 | Luecke | |
| 5,771,253 A | 6/1998 | Chang-Hasnain et al. | |
| 5,886,785 A | 3/1999 | Lefevre | |
| 5,917,625 A | 6/1999 | Ogusu et al. | |
| 5,960,133 A | 9/1999 | Tomlinson | |
| 6,097,859 A | 8/2000 | Solgaard et al. | |
| 6,204,946 B1 | 3/2001 | Aksyuk et al. | |
| 6,560,020 B1 | 5/2003 | Kramer | |
| 6,628,856 B1 | 9/2003 | Costello et al. | |
| 6,636,306 B2 | 10/2003 | He et al. | |
| 6,782,153 B2 | 8/2004 | Polinsky et al. | |
| 6,791,694 B2 | 9/2004 | Pezeshki | |
| 6,798,951 B2 | 9/2004 | Fabiny | |
| 6,801,551 B1 | 10/2004 | Delfyett et al. | |
| 6,832,022 B1 * | 12/2004 | Lefevre | ........................... 385/33 |
| 6,891,676 B2 | 5/2005 | Ford et al. | |
| 6,983,090 B2 | 1/2006 | Weber et al. | |
| 7,002,697 B2 | 2/2006 | Domash et al. | |
| 7,085,492 B2 | 8/2006 | Ibsen et al. | |
| 7,253,897 B2 | 8/2007 | Moon et al. | |
| 7,257,288 B1 | 8/2007 | Strasser et al. | |
| 7,321,704 B2 | 1/2008 | Ducellier et al. | |
| 7,359,051 B2 | 4/2008 | Shibata | |
| 7,408,639 B1 | 8/2008 | Strasser et al. | |
| 7,605,976 B1 | 10/2009 | Wolleschensky et al. | |
| 7,899,330 B2 | 3/2011 | Ye | |

(Continued)

OTHER PUBLICATIONS

Cahill, Michael; Bartolini, Glenn, "Distribution of Embedded DWDM Channel Monitors in Pass-Through Node Limited Transmission Links," Optical Fiber Communication and the National Fiber Optic Engineers Conference; vol., Issue, Mar. 25-29, 2007 pp. 1-4.

(Continued)

Primary Examiner — Derek S Chapel
(74) Attorney, Agent, or Firm — Fish & Richardson P.C.

(57) ABSTRACT

Spectrally filtering at least one input beam includes dispersing spectral components of at least one input beam at different respective angles in a spectral plane; changing at least some of the angles of the propagation axes of the dispersed spectral components so that the maximum angular separation among the propagation axes of the spectral components changes; receiving a plurality of the dispersed spectral components incident on a reflective surface at a location at which the central rays of each of the spectral components are incident at different points on the reflective surface; and tilting the reflective surface to select at least one and fewer than all of the received spectral components to be directed to a selected output path.

29 Claims, 15 Drawing Sheets

U.S. PATENT DOCUMENTS

| | | | |
|---|---|---|---|
| 2003/0043471 | A1* | 3/2003 | Belser et al. .............. 359/634 |
| 2003/0215182 | A1 | 11/2003 | Lin et al. |
| 2004/0136074 | A1 | 7/2004 | Ford et al. |
| 2004/0246477 | A1 | 12/2004 | Moon et al. |
| 2004/0252938 | A1 | 12/2004 | Ducellier et al. |
| 2005/0074204 | A1 | 4/2005 | Wilson et al. |
| 2005/0175362 | A1 | 8/2005 | Wilson |
| 2005/0213978 | A1 | 9/2005 | Yamashita et al. |
| 2006/0098981 | A1 | 5/2006 | Miura et al. |
| 2007/0041683 | A1 | 2/2007 | Keyworth |
| 2008/0085119 | A1 | 4/2008 | Ye et al. |
| 2008/0273560 | A1 | 11/2008 | Stelmakh |

OTHER PUBLICATIONS

G. D. Bartolini, "Low-cost optical monitoring for DWDM systems," Proc. OSA Topical Meeting on Optical Amplifiers, OWB1 (2004).

Bayspec product sheet downloaded from http://www.bayspec.com/pdf/OCPM.pdf on Aug. 6, 2007.

JDSU product sheet downloaded from http://products.jdsu.com/assets/public/pdf/wbcb_ds_cms_ae_020806.pdf on Aug. 6, 2007.

USPTO Non-final Office Action issued in U.S. Appl. No. 11/837,385, mailed Aug. 2, 2010, 13 pages.

U.S. Appl. No. 60/538,523, filed Jan. 22, 2004, Wilson.

"Diffraction grating handbook", Ch 13.2.1, Littman-Metcalf arrangement, http://gratings.newport.com/information/handbook/handbook.asp, 2012.

Derickson, et al., "Fiber Optic Test and Measurement," Prentice-Hall, Inc., pp. 102-103, 1998.

Littman et al., "Spectrally narrow pulsed dye laser without beam expander," Applied Optics, vol. 17, No. 14, pp. 2224-2227 (1978).

Lotem, "Grazing-incident spectrograph", Applied Optics [Online] 1994, vol. 33, Issue 7, pp. 1260-01263.

Sheat et al., Volume transmission gratings in dichromated gelatin for near infrared applications, Third International Conference on Holographic Systems, Components and Applications [Online], 1991, pp. 83-87.

File history wrapper of U.S. Appl. No. 11/625,253.

Letter by Anonymous Author regarding U.S. Appl. No. 11/625,253, Date Unknown.

Thomas D. MacBlain, Letter to James Hsue via U.S. Mail, Certified Return Receipt, Nov. 23, 2009, 1 page; and Thomas D. MacBlain, Letter to James Hsue via U.S. Mail, Certified Return Receipt, Oct. 30, 2009. 1 page.

Wilson et al., Spectral Filter with Independently Variable Center Wavelength and Bandwidth, presented at ECOC2004 Conference in Stockholm in August of 2004.

* cited by examiner

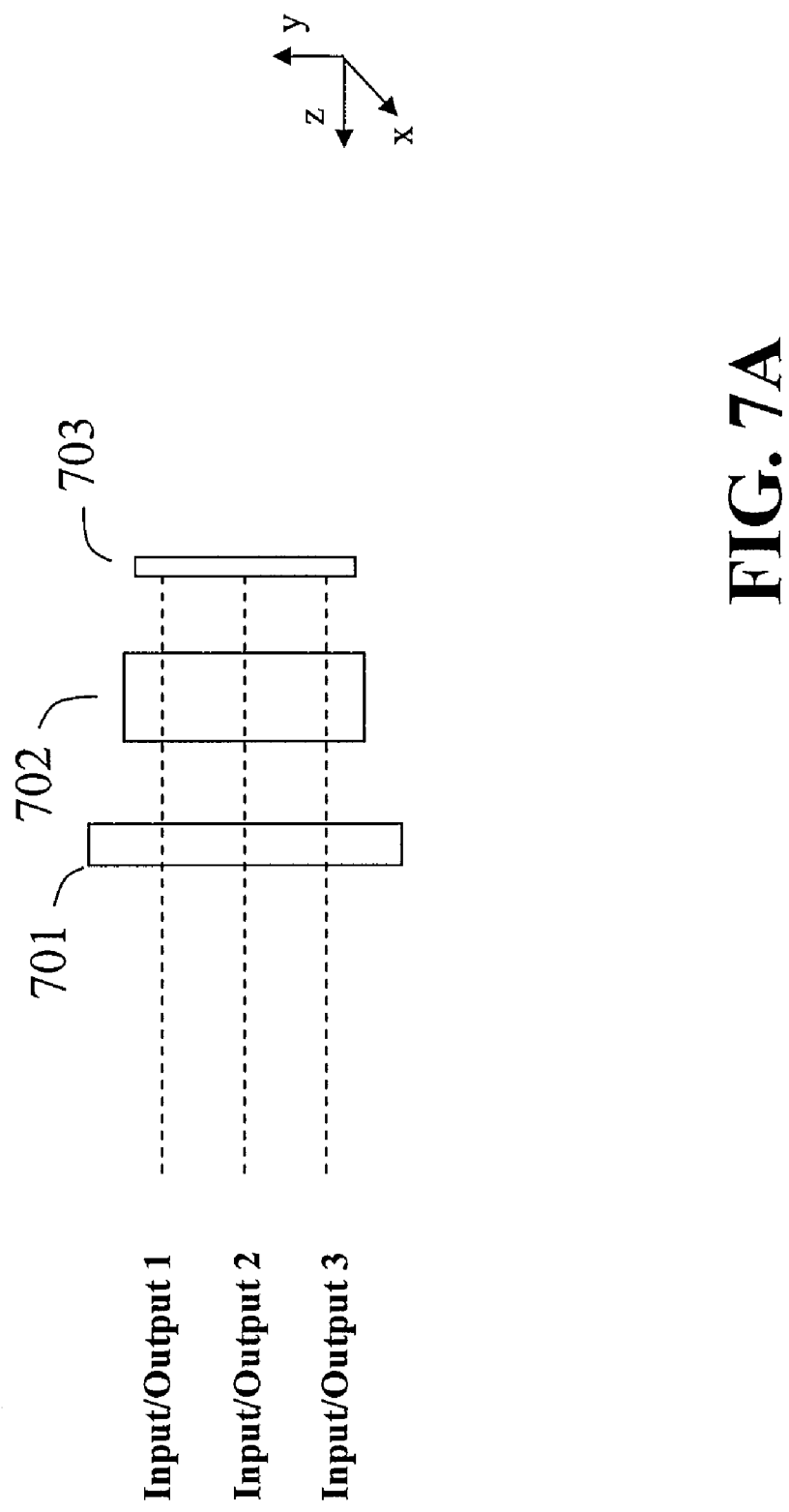

US 8,284,489 B2

SPECTRALLY ADJUSTABLE FILTER

BACKGROUND

This description relates to spectrally adjustable filtering.

Devices that spectrally filter and/or detect light can be used in optical communication systems, such as wavelength division multiplexed (WDM) systems, for adjustable filtering and attenuation of spectral components (or "wavelengths" or "channels") that are multiplexed together in the WDM spectrum. Such devices can be used for optical detection and monitoring of spectral components in the WDM spectrum. Typically, each spectral component has a nominal wavelength corresponding to the center frequency of a channel. In some systems, each spectral component has a spectral shape with a central lobe that has a narrow enough linewidth such that adjacent spectral components, whose center frequencies are separated by a given channel spacing, do not overlap significantly. In some systems, spectral components comprise respective sub-bands of wavelengths over a continuous spectrum that does not necessarily have any separation between adjacent spectral components. It is understood that the term "spectral component" as used herein should be construed broadly, and encompasses these various examples and other examples as understood in the art.

Wavelength filtering devices are typically classified as fixed or adjustable. Fixed devices filter a predetermined spectral band while adjustable filters allow reconfiguration of the wavelengths being filtered. Adjustable filtering devices provide the ability to dynamically update system configuration to optimize parameters such as transmission performance and bandwidth utilization. Adjustable filters also enable system operators to provision (turn up) new wavelengths and services.

Optical spectrum monitoring devices can be used within a WDM system to monitor system performance by measuring one or more optical signal attributes including wavelength, optical power, optical signal-to-noise ratio (OSNR), spectral shape, bit-rate, and polarization state, among others. The information provided by optical spectrum monitors may be utilized for system health reporting, fault location and analysis, feedback control and system optimization, and for other purposes.

Some optical component designs use optical elements in imaging configurations to enable and adjust functionality and performance. Some spectral filters utilize elements in imaging configurations. That is, they utilize elements to image beams or spectral components originating at one point in space to an intersection at a different point in space within the plane of spectral dispersion. These spectral filters place functional elements at the convergence points of the imaging configurations. Moreover, the functional elements are characteristically placed at distances from the imaging elements, e.g. lenses, that are equal to or greater than the focal lengths of the imaging elements.

A disadvantage of utilizing imaging configurations is that the optical path lengths of such configurations can be exceedingly long as the placement of the functional components are dictated by the focal lengths of the imaging elements (lenses). It is generally not possible to simply reduce the focal length without compromising spectral performance or cost or both. In particular, lens aberration effects (and associated spectral performance degradation) combined with the associated cost premiums of aspheric lenses that can provide acceptable performance and reliability, typically limit the applicability of imaging configurations. Accordingly, for many current WDM systems, which place a significant premium on size, performance, and cost, devices that employ imaging configurations may be at a disadvantage and may not even be realizable for some applications and requirements.

SUMMARY

In one aspect, in general, an apparatus for spectrally filtering at least one input beam comprises a spectrally dispersive element configured to disperse spectral components of at least one input beam at different respective angles in a spectral plane; one or more optical elements configured to change at least some of the angles of the propagation axes of the dispersed spectral components so that the maximum angular separation among the propagation axes of the spectral components changes; and a reflective surface configured to receive a plurality of the dispersed spectral components at a location at which the central rays of each of the spectral components are incident at different points on the reflective surface, and to tilt to select at least one and fewer than all of the received spectral components to be directed to a selected output path.

Aspects can include one or more of the following features.

The one or more optical elements are configured to change at least some of the angles of the propagation axes of the dispersed spectral components so that the maximum angular separation among the propagation axes of the spectral components increases.

The dispersed spectral components diverge at a first maximum angular separation and the one or more optical elements are configured to change at least some of the angles of the propagation axes of the dispersed spectral components so that the spectral components diverge at a second maximum angular separation larger than the first maximum angular separation.

The dispersed spectral components diverge at a first maximum angular separation and the one or more optical elements are configured to change at least some of the angles of the propagation axes of the dispersed spectral components so that the spectral components converge at a second maximum angular separation larger than the first maximum angular separation.

The one or more optical elements comprise at least one prism.

The one or more optical elements comprise two lenses having different focal lengths, and wherein the two lenses are separated by a distance that is approximately the sum of the focal lengths.

The one or more optical elements are configured to change the transverse spatial extent of each of the dispersed spectral components such that the transverse spatial extent of the input beam incident on the spectrally dispersive element is larger than the transverse spatial extent of each of the plurality of dispersed spectral components incident on the reflective surface.

The transverse spatial extent of the input beam incident on the spectrally dispersive element is larger than the total transverse spatial extent of all the dispersed spectral components incident on the reflective surface.

The transverse spatial extent of the input beam incident on the spectrally dispersive element is at least about two times larger than the transverse spatial extent of each of the plurality of dispersed spectral components incident on the reflective surface.

The spectrally dispersive element is configured to disperse the spectral components at the different respective angles from a common spatial mode.

The apparatus further comprises one or more optical elements configured to expand the input beam provided to the spectrally dispersive element from a guided spatial mode of a waveguide to the common spatial mode incident on the spectrally dispersive element.

The reflective surface receives the plurality of the dispersed spectral components after at least two passes through the one or more optical elements configured to expand the input beam.

The reflective surface is configured to receive dispersed spectral components from multiple input beams, and to tilt to select at least one and fewer than all of the received spectral components of a given input beam to be directed to a corresponding selected output path.

In another aspect, in general, a method for spectrally filtering at least one input beam includes dispersing spectral components of at least one input beam at different respective angles in a spectral plane; changing at least some of the angles of the propagation axes of the dispersed spectral components so that the maximum angular separation among the propagation axes of the spectral components changes; receiving a plurality of the dispersed spectral components incident on a reflective surface at a location at which the central rays of each of the spectral components are incident at different points on the reflective surface; and tilting the reflective surface to select at least one and fewer than all of the received spectral components to be directed to a selected output path.

In another aspect, in general, a system for monitoring spectra of spectral components of at least one input beam includes a spectrally dispersive element configured to disperse spectral components of at least one input beam at different respective angles in a spectral plane; one or more optical elements configured to change at least some of the angles of the propagation axes of the dispersed spectral components so that the maximum angular separation among the propagation axes of the spectral components changes; a reflective surface configured to receive a plurality of the dispersed spectral components at a location at which the central rays of each of the spectral components are incident at different points on the reflective surface, and to tilt to select at least one and fewer than all of the received spectral components to be directed to a selected output path; and at least one detector configured to receive a spectral component directed to a selected output path.

In another aspect, in general, an apparatus for spectrally filtering at least one input beam includes a spectrally dispersive element configured to disperse spectral components of at least one input beam at different respective angles in a spectral plane; one or more optical elements configured to change at least some of the angles of the propagation axes of the dispersed spectral components, at least one of the optical elements being located at a distance from the spectrally dispersive element that is less than the focal length of the at least one optical element; and a reflective surface configured to receive a plurality of the dispersed spectral components, and to tilt to select at least one and fewer than all of the received spectral components to be directed to a selected output path.

Aspects can include one or more of the following features.

The reflective surface is configured to receive a plurality of the dispersed spectral components at a location at which the central rays of each of the spectral components are incident at different points on the reflective surface.

The one or more optical elements comprise two lenses having different focal lengths, and wherein the two lenses are separated by a distance that is approximately the sum of the focal lengths.

The reflective surface is configured to receive dispersed spectral components from multiple input beams, and to tilt to select at least one and fewer than all of the received spectral components of a given input beam to be directed to a corresponding selected output path.

In another aspect, in general, an apparatus for spectrally filtering at least one input beam comprises a spectrally dispersive element configured to disperse spectral components of at least one input beam at different respective angles in a spectral plane; one or more optical elements configured to change at least some of the angles of the propagation axes of the dispersed spectral components so that the maximum angular separation among the propagation axes of the spectral components increases, and to change the transverse spatial extent of each of the spectral components to be smaller than the transverse spatial extent of the input beam incident on the spectrally dispersive element; and a reflective surface configured to receive a plurality of the dispersed spectral components, and to tilt to select at least one and fewer than all of the received spectral components to be directed to a selected output path.

Aspects can include one or more of the following features.

The one or more optical elements comprise at least one prism.

The one or more optical elements comprise two lenses having different focal lengths separated by a distance that is approximately the sum of the focal lengths.

The spectrally dispersive element is configured to disperse the spectral components at the different respective angles from a common spatial mode.

The apparatus further comprises one or more optical elements configured to expand the input beam provided to the spectrally dispersive element from a guided spatial mode of a waveguide to the common spatial mode incident on the spectrally dispersive element.

The reflective surface is positioned to receive the plurality of the dispersed spectral components after at least two passes through the one or more optical elements configured to expand the input beam.

Aspects can have one or more of the following advantages. It is understood that the following advantages are exemplary, and should not be construed as limitations on the invention. Certain advantages may or may not be present in any specific implementation.

Some characteristics of spectral filters and monitors include cost, size, spectral performance (e.g., resolution, filter shape, insertion loss, etc.), and reliability. In particular, some WDM systems are requiring significant reductions in cost and size without compromising on spectral performance and reliability. Some of the techniques described herein enable compact and low cost spectral filters and monitors that can maintain the spectral performance and reliability requirements.

One aspect of the spectral filtering apparatus is the use of non-imaging configurations of optical components. By employing non-imaging configurations of some examples described in more detail below, the optical path length can be reduced while maintaining the key optical performance advantages of imaging configurations.

Other features and advantages of the invention will become apparent from the following description, and from the claims.

DESCRIPTION OF DRAWINGS

FIG. 7A is a schematic view of an exemplary spectrally adjustable filter having multiple input/outputs.

DESCRIPTION

1 Overview

Figure 1A:
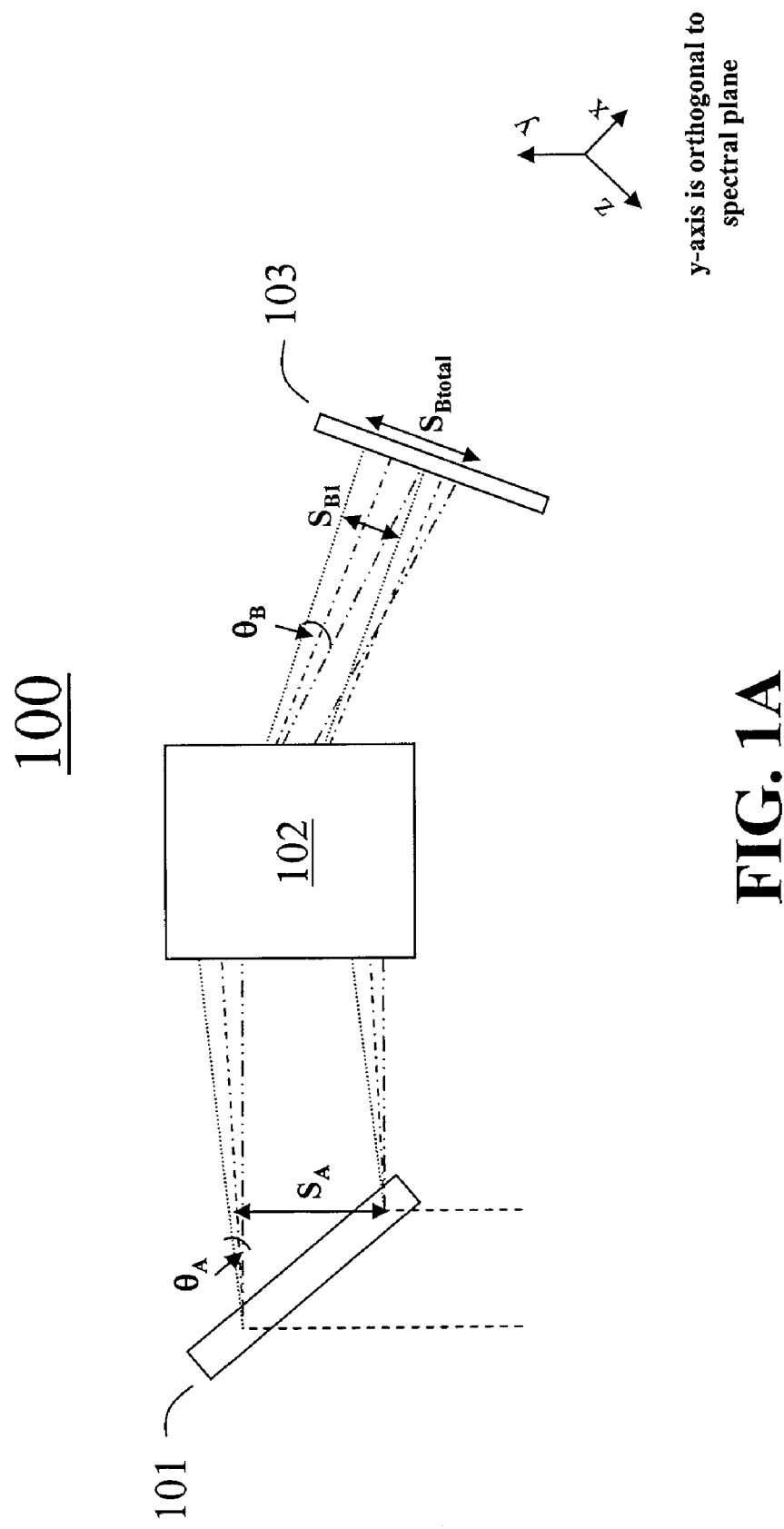
FIG. 1A is a schematic view of an exemplary spectrally adjustable filter.

FIG. 1A shows a configuration 100 of elements for a spectrally adjustable filter, which may be employed as part of a spectrum monitoring device. In this configuration, a spectrally dispersive element 101 receives an input beam having multiple spectral components generally propagating together along a common propagation axis from an input spatial mode. For example, the input beam may propagate out of a guided spatial mode of a waveguide such that the multiple spectral components are in a common spatial mode that is incident on the spectrally dispersive element 101. The spectrally dispersive element 101 disperses the spectral components at different respective angles. The angles of the spectral components are dispersed within a plane, referred to herein for convenience as the "spectral plane." For clarity the spectral plane is the x-z plane in FIGS. 1A and 1B. It is understood that the use of directional labels such as "x," "y," and "z" is for convenience and clarity only, and should not be construed as a limitation.

Referring to FIG. 1A, the dispersed spectral components pass through one or more optical elements (shown schematically as component 102 in FIG. 1A) and are incident on a reflective surface of a tiltable reflector 103. The tiltable reflector 103 tilts to select at least one and fewer than all of the received spectral components to be directed along a selected output path, for example back through the optical elements 102 and the spectrally dispersive element 101 to, for example, an output fiber, waveguide, and/or detector. It is understood that a spectral component may be "incident" or "received" on tiltable reflector 103 if not all of the power of the component falls on the surface. Only a useful portion of the spectral component need be incident or received on tiltable reflector 103.

It is further understood that different spectral components may, when selected by tiltable mirror 103, traverse different selected output paths upon reflection from the mirror. This is a function of the different incident paths from which the various spectral components are incident on tiltable mirror 103, and may also be a function of different output locations for which the spectral components are intended.

The one or more optical elements 102 are configured to change at least some of the angles of the propagation axes of the dispersed spectral components. This change can be accomplished, for example, using a prism and/or one or more lenses. Changing at least some of the angles of propagation enables the maximum angular separation among the propagation axes of the spectral components (i.e., the angle between the propagation axis of the spectral component with the smallest wavelength and the propagation axis of the spectral component with the largest wavelength) to be changed as appropriate for the filter implementation.

For example, in some filter implementations, the maximum angular separation $\theta_A$ after the spectrally dispersive element may be too large for a tilt range of the tiltable reflector 103. In such an implementation, the maximum angular separation $\theta_B$ after the optical elements 102 may be reduced to match the tilt range. Alternatively, in some filter implementations, the maximum angular separation $\theta_B$ after the optical elements 102 may be increased (up to an available tilt range) to improve the spectral resolution of the filter, as explained in more detail below. Some implementations may provide spectral components that are diverging at the tiltable reflector 103, and some implementations may provide spectral components that are converging at the tiltable reflector 103. It is understood that in both types of implementations, the maximum angular separation may be measured as defined above.

The one or more optical elements 102 also provide the ability to change the transverse spatial extent (as utilized herein, twice the $1/e^2$ beam diameter) of each of the spectral components, and/or the total transverse spatial extent of two or more spectral components. In some implementations, it is useful to be able to use a large input beam that can illuminate a large portion of the spectrally dispersive element 101, such as a grating (e.g., a transmissive or reflective diffraction grating). The optical elements 102 may enable the dispersed spectral components to each have a smaller transverse spatial extent at the tiltable reflector 103 than the transverse spatial extent of the input beam at the spectrally dispersive element 101.

In FIG. 1A, for example, the transverse spatial extent of the input beam incident on the spectrally dispersive element 101 is given by $S_A$. The transverse spatial extent of one of the spectral components at the tiltable reflector 103 is given by $S_{B1}$. Additionally, the total transverse spatial extent of all the dispersed spectral components incident on the tiltable reflector 103, given by $S_{Btotal}$, may be smaller than $S_A$. In the illustrated example the spectral components are overlapping, but in other examples the spectral components may not overlap (or may only overlap in the "tails" of the beam profile where the intensity is less than $1/e^2$ of the peak intensity) and may still have a smaller total spatial $S_{Btotal}$ extent than $S_A$.

Figure 1B:
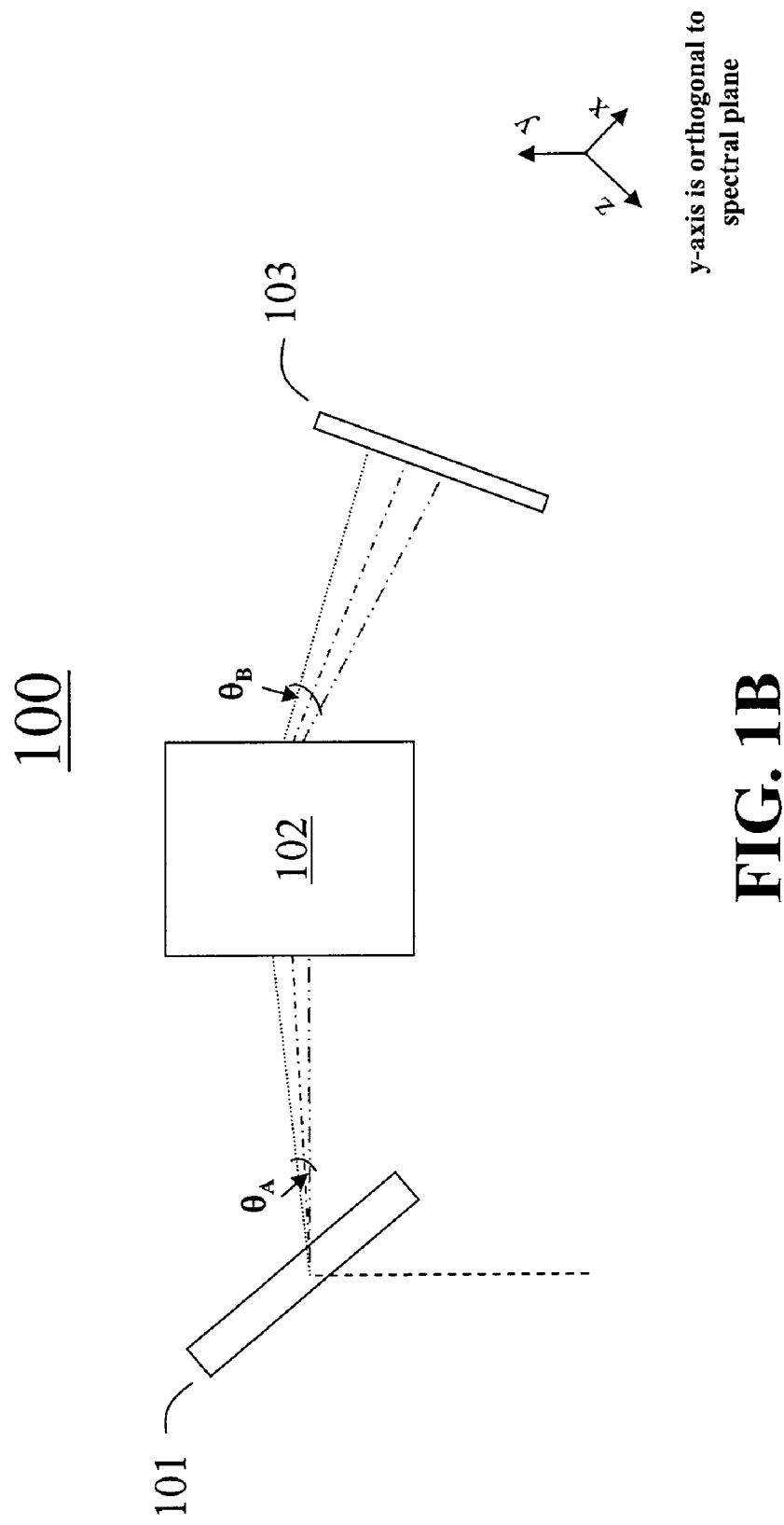
FIG. 1B is another schematic view of the exemplary spectrally adjustable filter of FIG. 1A.

As shown in FIG. 1B, in which only the central rays of the spectral components are drawn, the tiltable reflector 103 may receive the dispersed spectral components at a location at which the central rays of each of the spectral components are incident at different points on reflector 103. It is understood that the phrase "incident at different points" as used herein is construed broadly, to encompass not only situations where no spectral component is incident at substantially the same point as any other spectral component, but also encompasses situations where one or more of the dispersed spectral components are incident at substantially one point, and one or more other dispersed spectral components are incident at another point or substantially at that other point. It is further understood that when the central rays of dispersed spectral components are incident at different points, as described herein, that there may be overlap between and among the spectral components through their transverse spatial extent.

Figure 2A:
FIG. 2A is a schematic view of another exemplary spectrally adjustable filter.
Figure 2A:
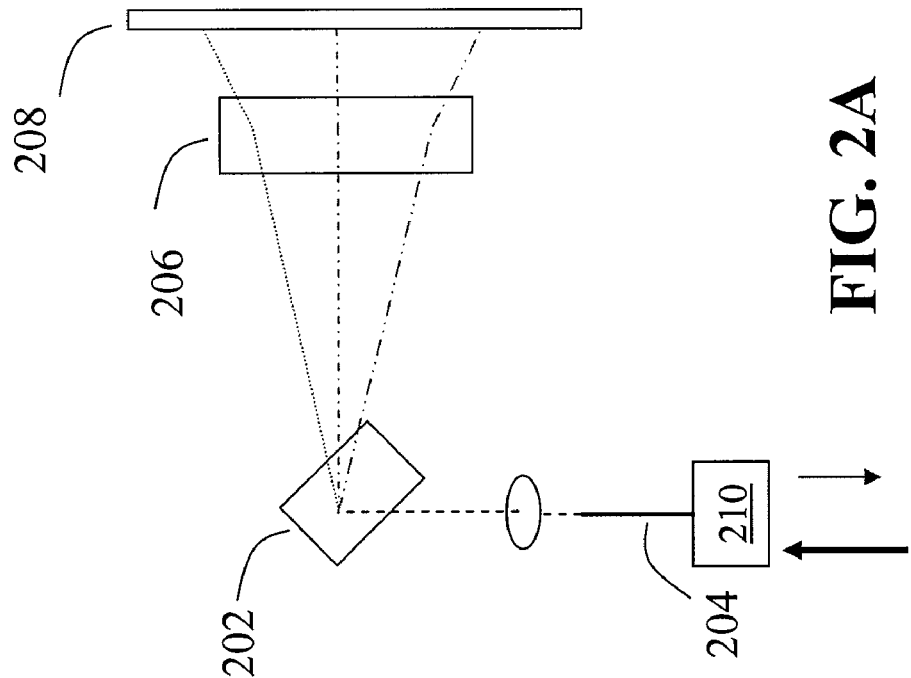
Figure 2B:
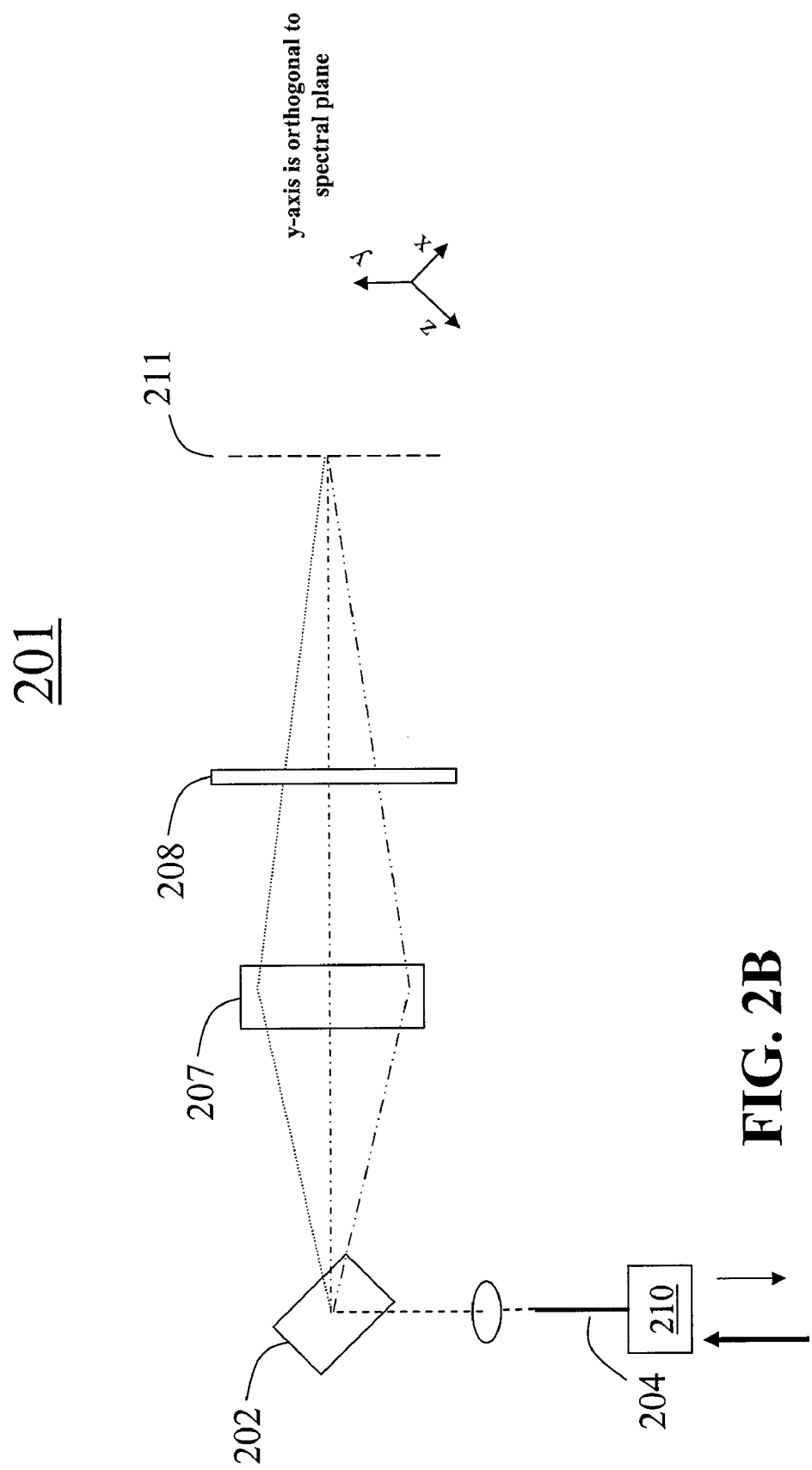
FIG. 2B is a schematic view of another exemplary spectrally adjustable filter.

Referring to FIGS. 2A and 2B, exemplary spectrally adjustable filter devices 200 and 201 include a spectrally dispersive element 202 that receives an input beam having multiple spectral components propagating together along a common propagation axis from an input spatial mode. In this example, the input spatial mode is defined by a waveguide 204 (e.g., an optical fiber). The spectrally dispersive element 202 angularly disperses different wavelengths. Thus, the spectral components, having different peak wavelengths, are dispersed such that the angles of their respective propagation axes are different. The angles of the spectral components are dispersed within the spectral plane, which is the x-z plane in FIGS. 2A and 2B. This angular dispersion produces spatial dispersion as the spectral components propagate away from the element 202. FIGS. 2A and 2B show views of the spectral components being dispersed in the spectral plane. For clarity, only the forward direction of propagation of the central ray of each spectral component is shown.

In the illustrated examples, the devices 200 and 201 include one or more optical elements, shown schematically as 206 (FIG. 2A) and 207 (FIG. 2B), configured to change some or all of the angles of the propagation axes of the dispersed spectral components while ensuring that a plurality of the dispersed spectral components remain close enough to reflect from a single reflective surface of a tiltable reflector 208. (It is understood that the term "optical elements" may be used herein to refer to a single element or multiple elements.)

Importantly for these examples, the spectral components do not converge to a point or substantially to a point on reflector 208. Referring to FIG. 2A, such a convergence would not take place, and therefore would prohibit the exemplary configuration of FIG. 2A. Referring to FIG. 2B, having the spectral components converge to a point or substantially to a point would necessitate moving the reflector 208 further away from the optical elements 207 and, hence, would increase the optical path length. Such an increase in length could be disadvantageous, particularly in implementations in which a compact device is preferred or required.

In an analogous imaging configuration, a point in an image expanding from element 202 would be imaged to a point at an image plane 211. In the configuration for a spectral filter in this example, instead of imaging points in a source wavefront to respective points in an image plane, the optical elements 207 function to change the propagation axes and beam profiles of dispersed spectral components. The reflector 208 may receive the dispersed spectral components at a location at which the central rays of the spectral components are incident at different points on reflector 208 (rather than converging to substantially the same point on reflector 208, as in an analogous imaging system). Therefore, the reflector 208 can be placed close to the optical elements 207 to be tilted to select a spectral component for filtering. There is no need for the spectral components to converge to a point or substantially to a point, and a device can have a compact path.

In the illustrated example, all or substantially all of the spectral components are received by (i.e., incident on) the reflective surface. In other examples, a smaller subset of the dispersed spectral components from a given input beam may be received by the reflective surface. The reflector 208 is preferably configured to tilt (e.g., on a rotation stage) about the axis perpendicular to the spectral plane, although another axis or combination of axes could be selected if useful. The preferred tilt axis may be referred to herein as the y-axis, although again, it is understood that any nomenclature for such axis or other axis is for convenience and clarity only, and should not be construed as a limitation.

Since the spectral components generally arrive at the surface of the reflector 208 at different angles of incidence (diverging in FIG. 2A and converging in FIG. 2B), tilting the reflector 208 selects one of the dispersed spectral components to be directed to a selected output path. A given angle corresponds to a specific spectral component that is to be directed to its selected output path. In the device 200, the selected output path returns the spectral components to the input spatial mode defined by the waveguide 204 (where a "spatial mode" refers to the transverse spatial profile of a beam and not its direction of propagation). In this configuration, the selected spectral component is retro-reflected back to the spectrally dispersive element along substantially the same angle in both the spectral plane and the orthogonal y-z plane at which the selected spectral component was dispersed. A coupler 210 may be used to couple the input beam into the waveguide 204, and to couple the selected output spectral component from the waveguide 204. In many spectrally adjustable filter applications, low insertion loss is an important optical performance parameter. Accordingly, the coupler 210 could be replaced by a circulator, for example, to provide lower insertion loss.

Various types of optical elements can be used to change the angles and transverse spatial extent as described above. One example shown below uses a prism. Another example shown below uses one or more lenses in a non-imaging configuration. Other examples may utilize both a prism and one or more lenses.

2 Additional Exemplary Filter Configurations

Figure 3A:
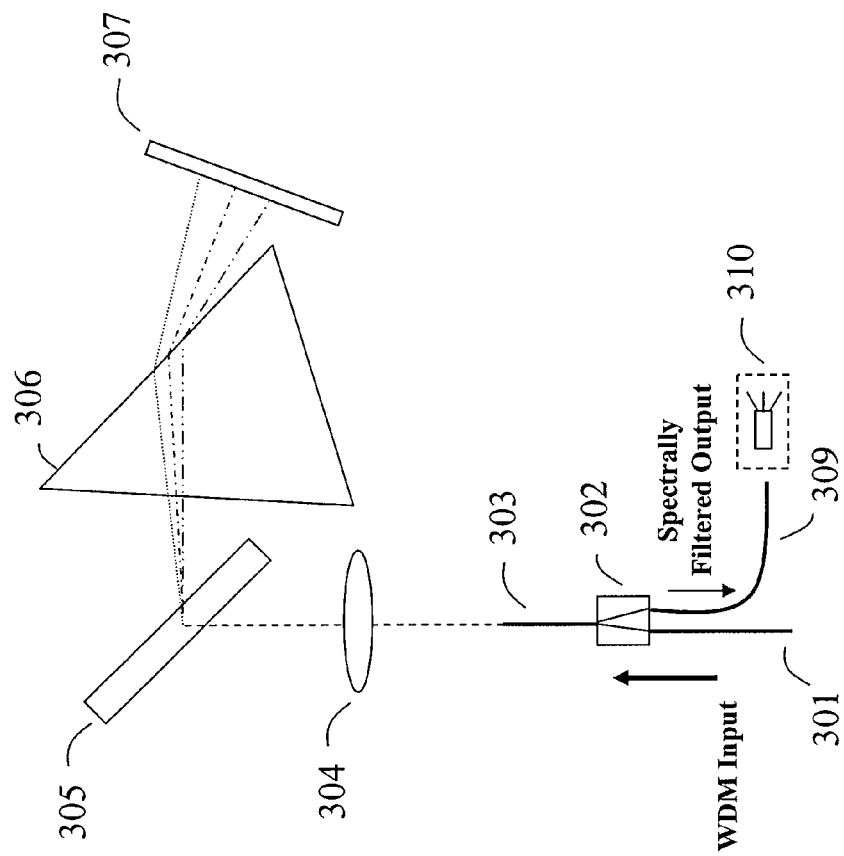
FIG. 3A is a schematic view of another exemplary spectrally adjustable filter.
Figure 3B:
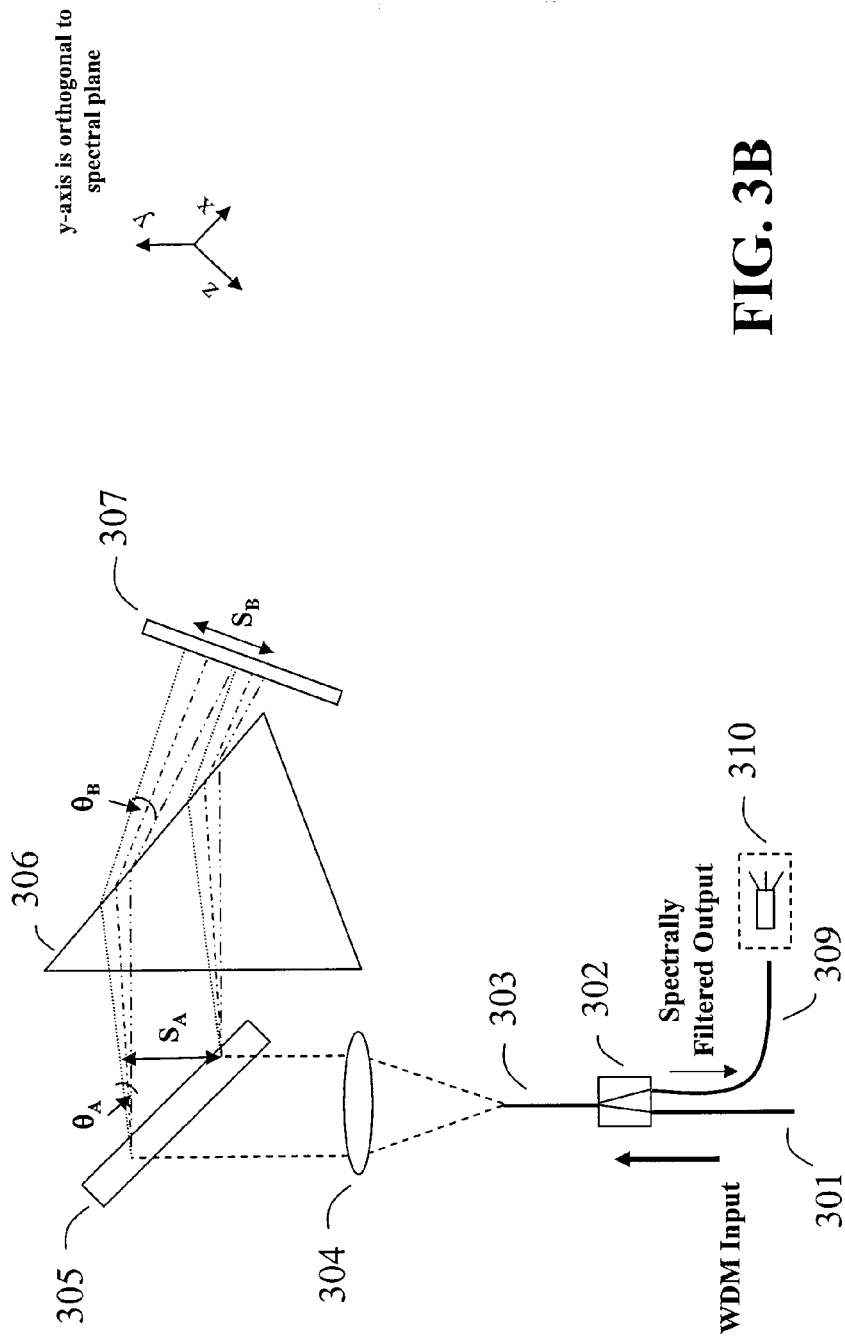
FIG. 3B is a further schematic view of the exemplary spectrally adjustable filter of FIG. 3A.
Figure 3C:
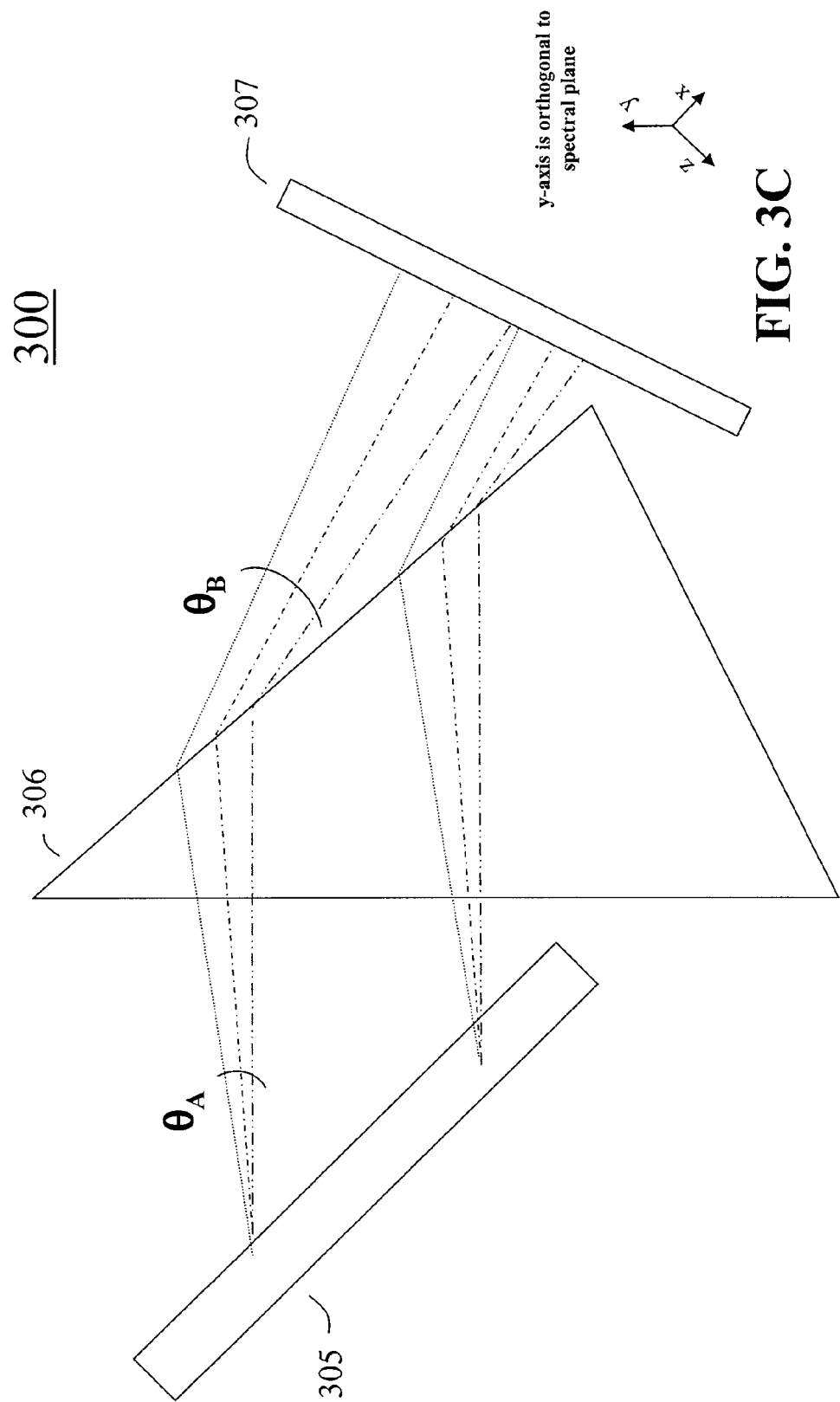
FIG. 3C is a schematic view of selected components of the exemplary spectrally adjustable filter of FIG. 3A.

In another exemplary configuration, shown in FIGS. 3A, 3B, and 3C, an anamorphic prism is used as the optical element configured to change some or all of the angles of the propagation axes of the dispersed spectral components. For clarity, only the forward direction of propagation of is drawn. For clarity, FIG. 3A shows the central rays of the spectral components, and FIGS. 3B and 3C show the outer rays of the spectral components.

With reference to FIG. 3A, an exemplary device 300 includes a device input fiber 301, a fiber coupler 302, an input/output fiber 303, an input/output lens 304, and a transmissive diffraction grating 305. In this configuration, a prism 306 directs the angularly dispersed spectral components onto a tilt mirror 307. The tilt mirror 307 is actuated about the y-axis to selectively redirect spectral components along selected output paths, for example back along their incident paths. Spectral components that are directed back along their incident paths may be coupled into input/output fiber 303, and then directed by coupler 302 to a device output fiber 309. Accordingly, spectral components that are not directed by mirror 307 back along their incident paths might not be coupled back into input/output fiber 303 and, if not coupled, will not be present in the filtered output signal of the device. Optionally, a detection element 310 may be placed at a useful location, for example at the exit of the device output fiber 309, to detect the filtered output. As such, by actuation of mirror 307 and by measuring the detector 310 signal (e.g. current or voltage), the spectral components of the input WDM signal can be discerned.

For illustrative purposes, FIGS. 3B and 3C show the outer rays of the spectral components and, for clarity, only the forward direction of propagation of each spectral component is shown. Importantly for this example, the elements of exemplary device 300 are placed in a non-imaging configuration, wherein the spectral components do not converge to a point at mirror 307. In this illustrative example, the divergence of the relative angles of propagation of the spectral components is increased by prism 306 (i.e. $\theta_B > \theta_A$). Additionally, prism 306 may act to reduce the spectral component beam diameters prior to their impingement on mirror 307. In some cases, the spatial extent of the spectral components at mirror 307 may be less than the spatial extent of spectral components at grating 305 (i.e. $S_B < S_A$).

Advantages of the configuration of device 300 may include a short optical path length, the ability to control angular magnification/de-magnification of dispersed spectral components (e.g. to match the relative propagation angles of spectral components dispersed by grating 305 to the available tilt range of tilt mirror 307), the ability to control the spatial extent of the spectral component beams via beam magnification/de-magnification (e.g. to enable a large beam on grating 305 and smaller beam on the mirror 307), and the reduction in component count and cost. In other words, device 300 may maintain the potential spectral performance benefits of an imaging configuration but at a reduced cost and reduced size.

Figure 4A:
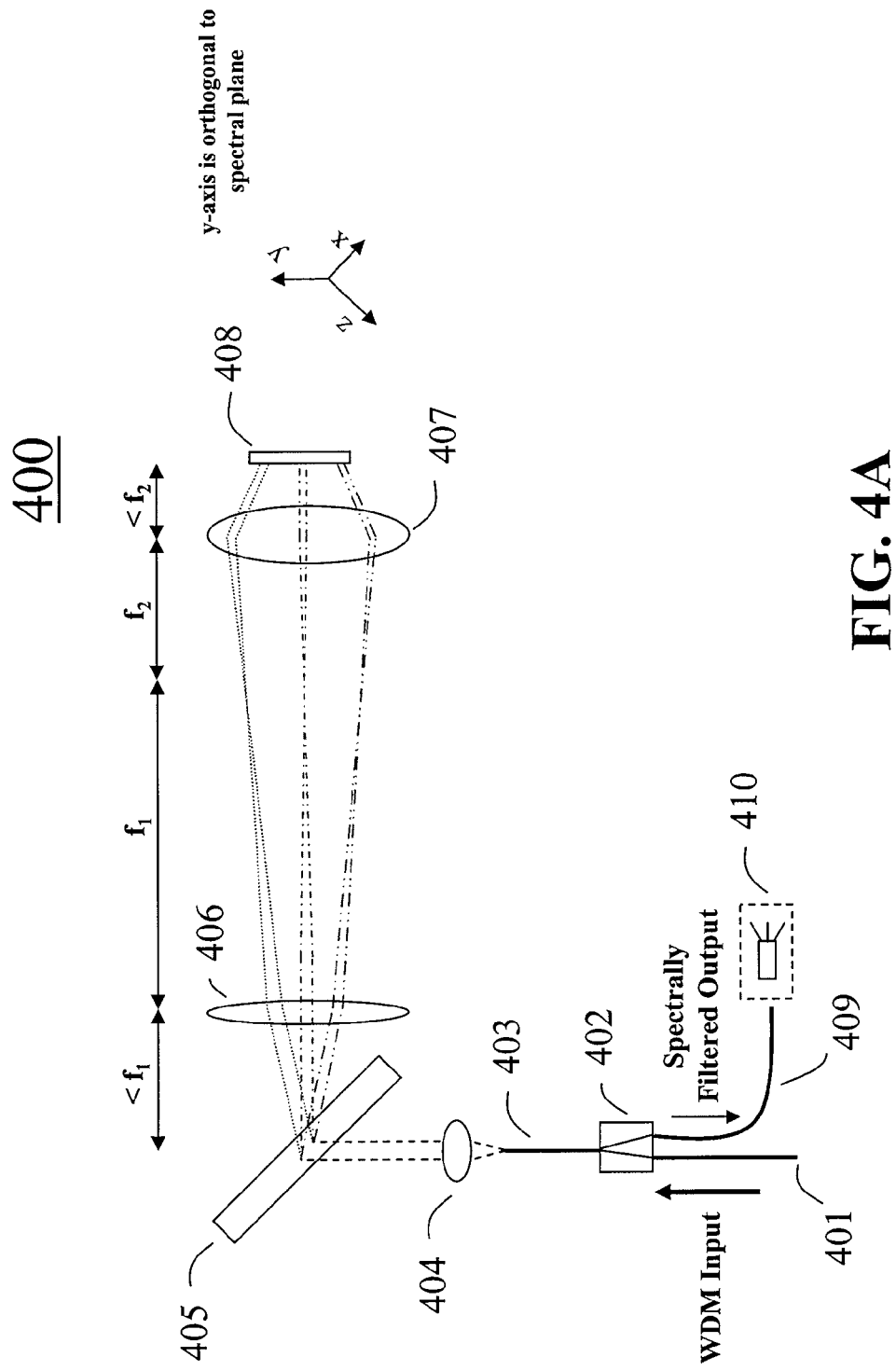
FIG. 4A is a schematic view of another exemplary spectrally adjustable filter.
Figure 4B:
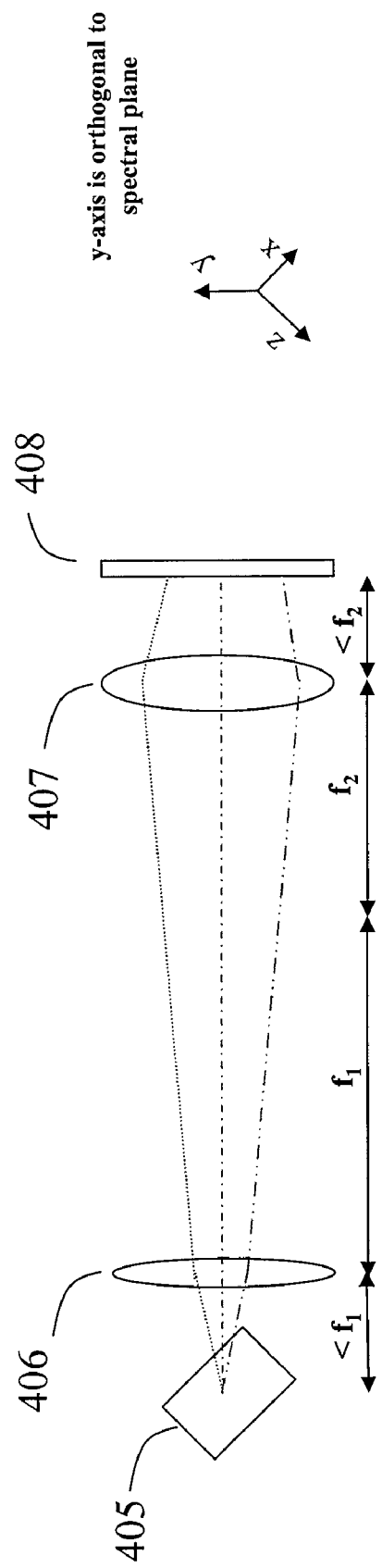
FIG. 4B is a schematic view of selected components of the exemplary spectrally adjustable filter of FIG. 4A.

FIGS. 4A and 4B show an exemplary non-imaging configuration that employs two lenses 406 and 407 as the optical elements configured to change some or all of the angles of the propagation axes of the dispersed spectral components. With reference to FIG. 4A, exemplary device 400 includes a device input fiber 401, a fiber coupler 402, an input/output fiber 403, an input/output lens 404, and a transmissive diffraction grating 405. In this configuration, the lenses 406 and 407 act to direct the angularly dispersed spectral components onto a tiltable reflector 408. Tiltable reflector 408 is actuated about the y-axis to selectively redirect spectral components along a selected output path, for example back along their incident paths. Spectral components that are directed back along their incident paths may be coupled into input/output fiber 403, and then directed by coupler 402 to a device output fiber 409. Accordingly, spectral components that are not directed by tiltable reflector 408 back along their incident paths might not be coupled back into input/output fiber 403 and, if not coupled, will not be present in the filtered output signal of the device. Optionally, a detection element 410 may be placed at a useful location, for example at the exit of the device output fiber 409, to detect the filtered output. As such, by actuation of mirror 408 and by measuring the detector 410 signal (e.g. current or voltage), the spectral components of the input WDM signal can be discerned.

In the exemplary configuration of FIGS. 4A and 4B, the separation between lens 406, having focal length $f_1$, and lens 407, having focal length $f_2$, is substantially the sum of their focal lengths (i.e., $f_1 + f_2$), such that collimated beams incident at lens 406 also are collimated after they exit lens 407. As can be understood from the Figures and accompanying description herein, two lenses may enable flexibility in optimizing the combination of a) the size of the input beam on grating 405 relative to the spatial extent of the beams at tiltable reflector 408, b) the sizes and positions of the beams on the lenses 406 and 407, c) the magnification/de-magnification of relative angles of propagation between spectral components, and d) the path length.

The size of the input beam on grating 405 may affect spectral performance. For example, better spectral resolution and filter shape, including an improved ability to resolve adjacent spectral components, is often achieved when a larger number of grating rulings are illuminated. Consequently, it may be advantageous to maximize the size of the input beam on the grating 405. As another example, the spatial extent of the spectral component beams at tiltable reflector 408 may affect the type of tiltable reflector 408 that can be employed.

Mirrors that meet the cost and reliability requirements of telecommunications systems, such as MEMs mirrors, often have relatively small optical surface dimensions. Accordingly, in some applications, it may be beneficial to have a smaller spatial extent of the spectral components at tiltable reflector 408 relative to the spatial extent of the spectral components at grating 405.

The sizes and positions of the beams on lenses 406 and 407 may be selected in a useful manner, for example to allow the usage of less expensive and/or smaller components. For example, the aberration of a spherical lens may be determined by the size and position of beams on the lens relative to the lens focal length. Consequently, proper design can reduce aberration and enable the use of spherical lenses which are often less expensive than aspherical lenses.

For illustrative purposes, FIG. 4B only shows the optical path between the dispersive element 405 and the tiltable reflector 408 and, for clarity, only the forward direction of propagation of the central ray of each spectral component is shown. Importantly for this example, the elements of exemplary device 400 are placed in a non-imaging configuration, wherein the spectral components do not converge to a point at mirror 408. In particular, tiltable reflector 408 is placed at a distance from lens 407 less than the distance between lens 407 and the convergence point of the spectral components. In one example, tiltable reflector 408 is placed at a distance from lens 407 approximately equal to or less than the focal length ($f_2$) of lens 407. In a further example, tiltable reflector 408 is be placed at a distance from lens 407 less than ½ of the distance between lens 407 and the convergence point of the spectral components.

Also in this exemplary configuration, lens 406 is placed close to grating 405, for example at a distance from grating 405 that is less than the focal length ($f_1$) of lens 406. In some cases, lens 406 may be placed at a distance from grating 405 that is substantially less than the focal length of lens 406 (e.g. as close to grating 405 as practical). In an exemplary configuration, lens 406 may be placed at a distance from the grating that is less than ¼ of the focal length of lens 406.

Some advantages of the configuration of device 400 may include a short optical path length, the ability to control angular magnification/de-magnification of dispersed spectral components (e.g. to match the relative propagation angles of spectral components dispersed by grating 405 to the available tilt range of tiltable reflector 408), the ability to control the spatial extent of the spectral component beams via beam magnification/de-magnification (e.g. to enable a large beam on grating 405 and smaller beam on the tiltable reflector 408), and to control the position of the spectral component beams on the lenses (e.g. to enable the beams to be close to the central axis of lens 406).

A further advantage of this non-imaging configuration relative to an analogous two lens imaging configuration, in which the tiltable reflector 408 would be at the image plane and in which lens 406 would be at a distance substantially equal to its focal length away from grating 405, is a much shorter path length. In particular, for equivalent focal lengths, and when lens 406 is placed close to grating 405 (i.e., at a distance shorter than the focal length of lens 406) and tiltable reflector 408 is placed close to lens 407, the FIG. 4B optical path length of device 400 can be nearly half that of an analogous imaging device. It can be understood that that the angular and beam magnification/de-magnification (which may affect spectral resolution) of both systems may be the same and, as such, there is no inherent compromise in spectral performance of device 400 relative to an analogous imaging device.

For some applications, the configuration of device 400 can have further improved spectral performance relative to the analogous imaging device in that aberrations caused by lens 406 may be reduced since the spectral components are incident closer to the optical axis of lens 406 of device 400 than they would be in an analogous imaging configuration in which lens 406 would be located at a distance substantially equal to its focal length away from grating 405.

For some applications, the configuration of device 400 can have a cost advantage relative to the analogous imaging device. In particular, with an analogous imaging device, some applications may require the device to utilize one or more aspheric lenses within the optics in order to reduce aberrations caused by the lenses. In some cases of such applications, exemplary device 400 would be able utilize a less costly spherical lens for lens 406, since, when lens 406 is placed close to grating 405, the spectral component beams incident on lens 406 remain close to the optical axis of lens 406.

It can be understood from the Figures and description herein that either selection of a distance between lens 407 and tiltable reflector 408 according to the description herein, or selection of the distance between grating 405 and lens 406 according to the description herein, may be advantageous. Accordingly in exemplary spectrally adjustable filters using the techniques described herein, either of such distances may be selected according to the description herein, or both such distances may be selected according to the description herein.

Figure 5:
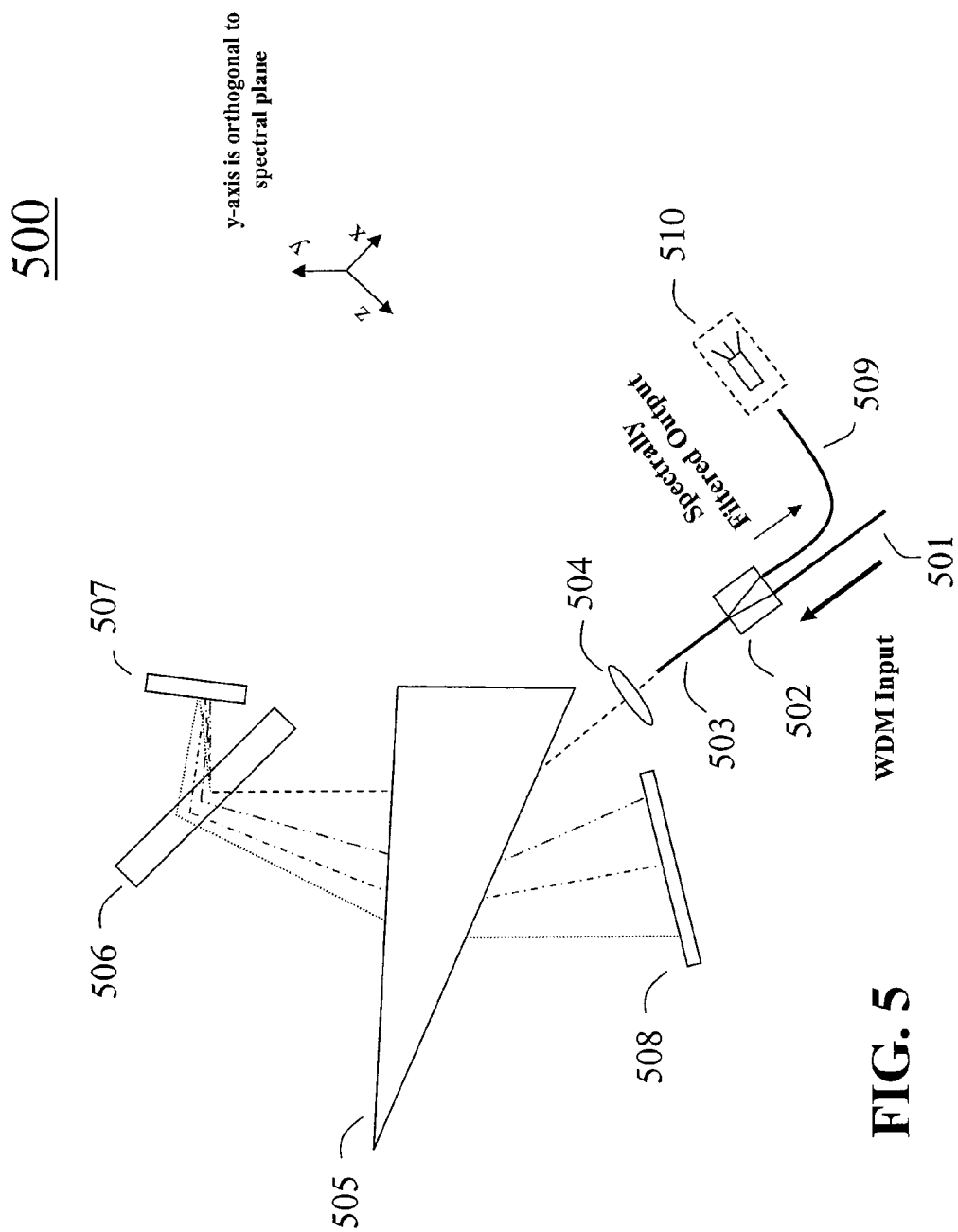
FIG. 5 is a schematic view of another exemplary spectrally adjustable filter.

Another exemplary configuration is shown in FIG. 5 in which a single prism is utilized to expand an input beam as well as to compress the beams of dispersed spectral components. For clarity, only the forward direction of propagation of the central ray of each spectral component is shown in the example of FIG. 5.

With reference to FIG. 5, a WDM input signal enters device 500 at input fiber 501, passes through coupler 502 and input/output fiber 503, and is collimated by input/output lens 504. The beam may then be expanded by prism 505 so that the beam incident on grating 506 illuminates a greater number of grating rulings than would be illuminated absent expansion by prism 505.

In this example, transmission grating 506 disperses the WDM signal into its constituent spectral components which are then reflected by a mirror 507, for example a fixed mirror. If a fixed mirror is utilized as mirror 507 in FIG. 5, the mirror 507 may be oriented to reflect the spectral components back toward grating 506, but to a different location on grating 506 such that the spectral components impinge on grating 506 and are further dispersed in angle. The spectral components then pass through prism 505, which may compress the individual spectral component beams and/or may increase the angles between spectral components.

As shown in FIG. 5, prism 505 may direct the angularly dispersed spectral components onto tiltable reflector 508. The tiltable reflector 508 may be actuated about the y-axis to selectively redirect spectral components along a selected output path, for example back along their incident paths. Spectral components that are directed back along their incident paths pass through grating 506 two additional times relative to many alternative arrangements, and are further dispersed relative to nearby spectral components. Accordingly, device 500 may have four times the spectral resolving performance than devices employing a single pass through an equivalent transmission grating. The selectively redirected spectral components may propagate substantially back along their incident paths and may be coupled into input/output fiber 503. Such spectral components may then be directed by coupler 502 to a device output fiber 509.

In the exemplary embodiment of FIG. 5, spectral components that are not directed by tiltable reflector 508 back along their incident paths might not be coupled back into input/output fiber 503 and, if not coupled, will not be present in the filtered output signal of the device. Optionally, a detection element 510 may be placed at a useful location, for example at the exit of the device output fiber 509, to detect the filtered output. As such, by actuation of tiltable reflector 508 and by measuring the detector 510 signal (e.g. current or voltage), the spectral components of the input WDM signal can be discerned.

Figure 6A:
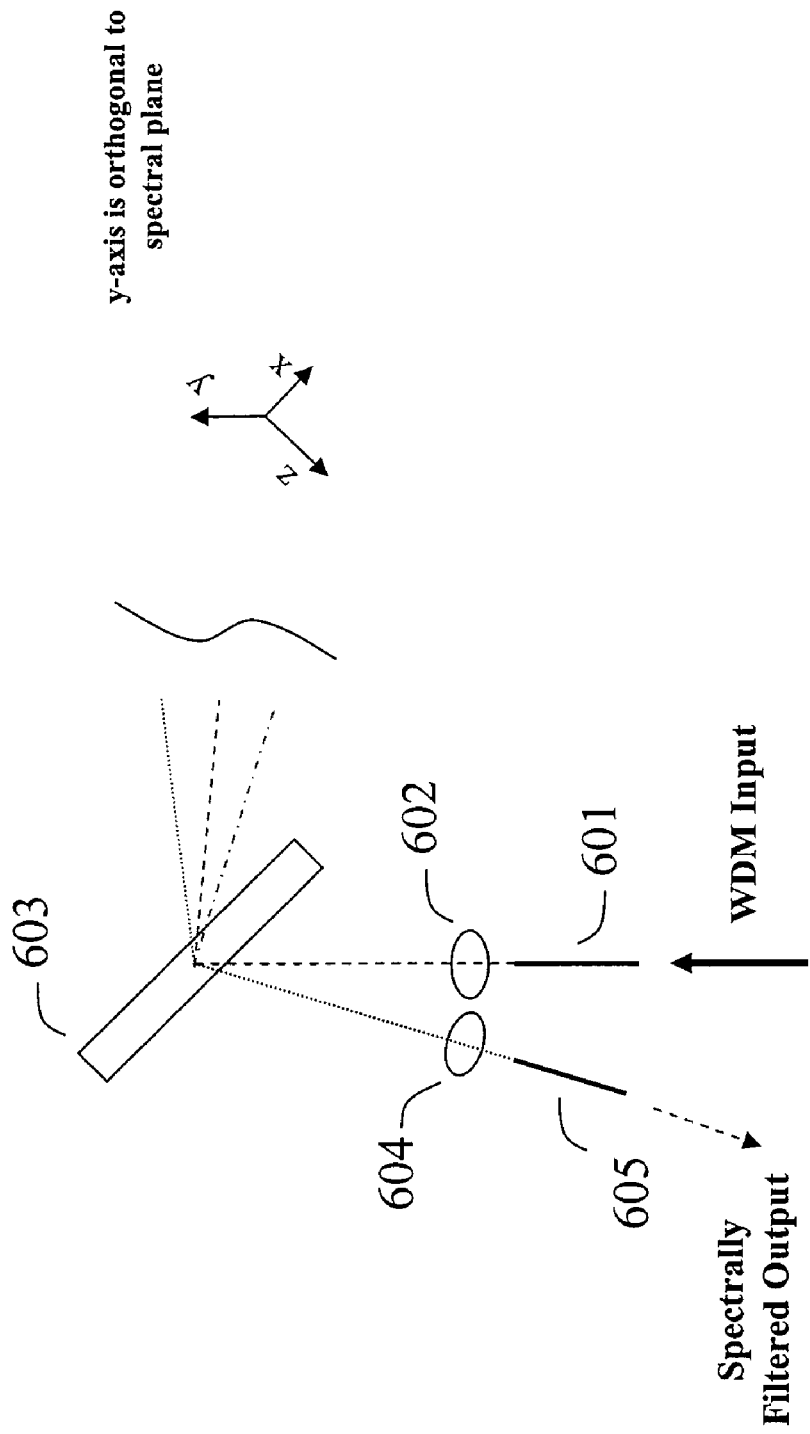
FIG. 6A is a schematic view of exemplary input and output components for a spectrally adjustable filter.
Figure 6B:
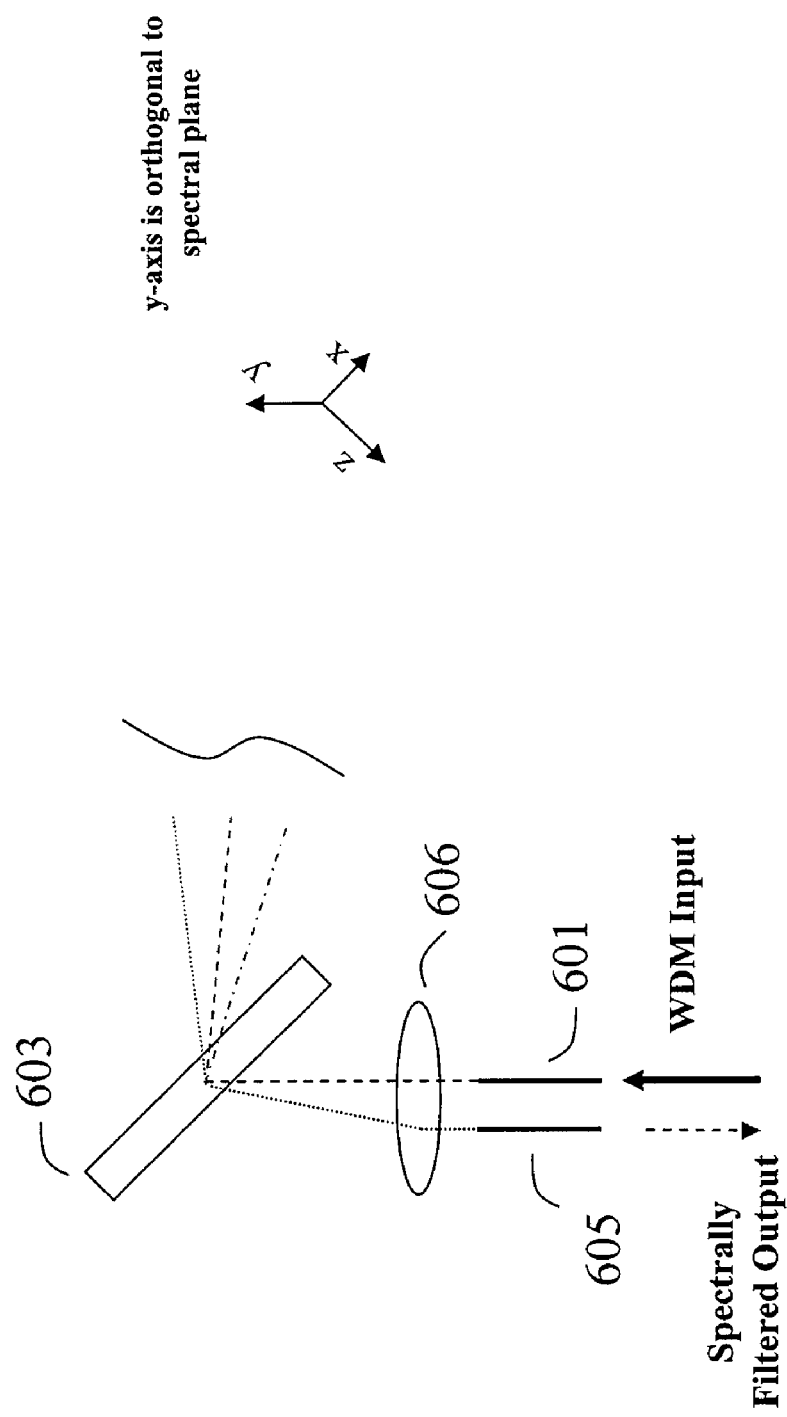
FIG. 6B is a schematic view of another example of input and output components for a spectrally adjustable filter.

Other exemplary configurations may eliminate the need for a coupler or circulator, and may reduce insertion loss. FIGS. 6A and 6B show exemplary input and output geometries for the WDM input signals and the filtered output light. Only the input and output elements along with the dispersive element are shown in FIGS. 6A and 6B. It can be understood from the Figures and description herein that these geometries can be applied to the exemplary configurations of FIGS. 2 through 5 as well to other configurations.

With reference to the example of FIG. 6A. the WDM input signal enters a device at input fiber 601. After passing through input fiber 601, the WDM input signal is collimated by input lens 602, which directs the input beam toward grating 603. Other input optics (not shown), such as beam expanders, may be optionally placed between input output/lens 602 and grating 603. Selectively redirected spectral components passing back through grating 603, and through any other output optics (not shown) on their egress path, may be directed by output lens 604 toward output fiber 605 such that they may be coupled into output fiber 605.

FIG. 6B shows an exemplary configuration utilizing a single input/output lens. In this exemplary configuration, the WDM input signal enters a device at input fiber 601 and is collimated by input/output lens 606. The selectively redirected spectral components of a device, propagating back along their egress path, are directed by input/output lens 606 toward output fiber 605 and may be coupled into output fiber 605.

Figure 7B:
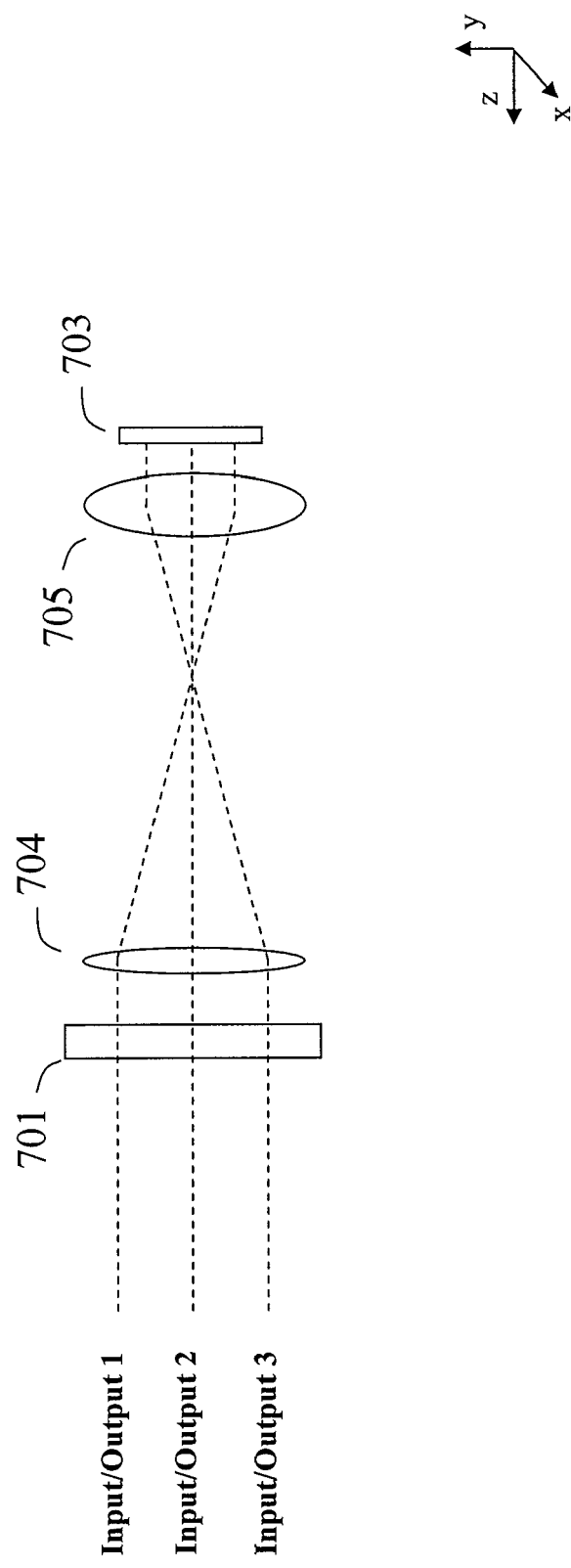
FIG. 7B is a schematic view of another exemplary spectrally adjustable filter having multiple input/outputs.
Figure 7C:
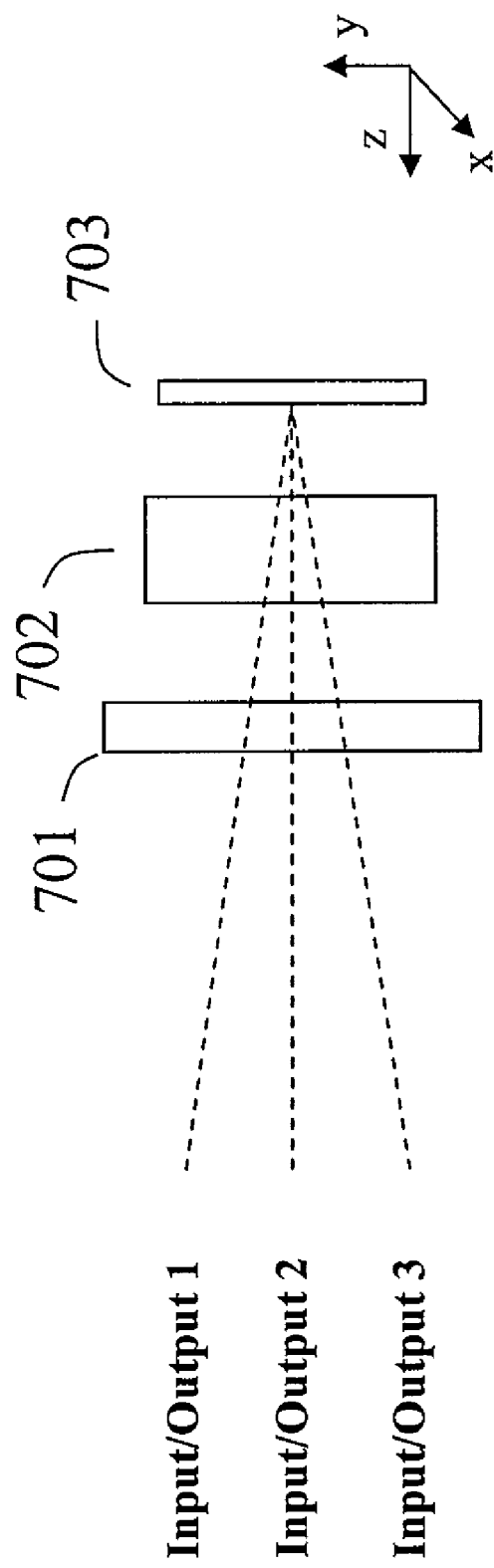
FIG. 7C is a schematic view of another exemplary spectrally adjustable filter having multiple input/outputs.

Other exemplary configurations, shown in FIGS. 7A, 7B, and 7C, may allow for multiple device inputs and outputs. The figures schematically show the direction of propagation of beams in a plane perpendicular to the spectral plane. For clarity and convenience, only the generic input and output beam configurations are shown. It can be understood from the Figures and description herein that these multiple input and output geometries can be applied to the exemplary configurations of FIGS. 2 through 5 as well to other configurations.

With reference to the example of FIG. 7A, multiple input/output beams pass through a dispersive element 701 and optical elements 702, which are configured to change some or all of the angles of the propagation axes of the dispersed spectral components. Following the optical elements, the multiple input/output beams impinge on tiltable reflector 703. The tiltable reflector 703 may be actuated about the y-axis to selectively redirect spectral components to an output. In an exemplary configuration, the dispersive element 701 may be a transmission grating, the optical elements 702 may be a prism, and the tiltable reflector 703 may be a tilt mirror (e.g. an eletromagnetically or electrostatically-acutated MEMS mirror), although other useful configurations may be utilized.

With reference again to the example of FIG. 7A, the input/output beams are shown as being parallel, which, in certain exemplary configurations, may allow for simultaneous scanning of multiple WDM inputs as tiltable reflector 703 is actuated. In other exemplary configurations, the input/output beams in FIG. 7A may be directed so they are not parallel. In such configurations, tiltable reflector 703 may be actuated about the x-axis to redirect beams back to respective device input/output ports. That is, tiltable reflector 703 may be actuated about the x-axis to a first position such that input/output beam 1 may be selectively directed back along an incident y-axis path. Tiltable reflector 703 may further be actuated about the x-axis to a second position wherein input/output beam 2 is directed back along an incident y-axis path. Tiltable reflector 703 may further be actuated about the x-axis to a third position wherein input/output beam 3 is directed back along an incident y-axis path. In such a manner, a given input/output port may be selected, and the spectral components of the selected input/output may be selectively filtered by actuation of the tilt reflector 703 about the y-axis.

FIG. 7B shows an exemplary multiple device input and output configuration in which the optical elements configured to change some or all of the angles of the propagation axes of the dispersed spectral components comprise two lenses separated substantially by the sum of their focal lengths. FIG. 7C shows an exemplary configuration in which multiple input/output beams may be directed to the tiltable reflector 703, such that actuation of tiltable reflector 703 about the x-axis directs spectral components from one input/output direction to another input/output direction. In this exemplary configuration, spectral components from a particular input/output port can be directed to a different input/output port by selectively actuating reflector 703 about the x-axis.

While the exemplary configurations of FIGS. 7A, 7B, and 7C show three input/output ports, it is understood that there may be provided a different number of input/output ports for the configurations of FIGS. 7A, 7B, and 7C, for example two or more input/output ports. It is further understood that the input/output ports may have associated one or more couplers, or circulators, and/or separate input and output fibers, among other potential configurations. Further, and in particular for the case (although not limited to the case) in which one or more couplers or circulators are placed at the input/output ports, each port may serve as an input, an output, or both in any of the configurations 7A, 7B, and 7C.

Other embodiments are within the scope of the following claims. For example, some additional features and configurations that can be incorporated into various implementations are described in U.S. application Ser. No. 11/837,385, incorporated herein by reference.

What is claimed is:

1. An apparatus for spectrally filtering at least one input beam, comprising:
    a spectrally dispersive element configured to disperse spectral components of the at least one input beam at different respective angles in a spectral plane;
    one or more optical elements, including at least a first optical element having first and second non-parallel surfaces through which the dispersed spectral components pass, configured to change at least some angles of propagation axes of the dispersed spectral components so that a maximum angular separation among the propagation axes of the dispersed spectral components changes, with the first optical element configured to substantially preserve collimation of the dispersed spectral components over an entire propagation path between the first and second non-parallel surfaces; and
    a single reflective surface configured to receive a plurality of the dispersed spectral components in which central rays of the spectral components are incident at different points on the single reflective surface, and to tilt to select at least one and fewer than all of the received dispersed spectral components to be directed to a selected output path.

2. The apparatus of claim 1, wherein the one or more optical elements are configured to change at least some of the angles of the propagation axes of the dispersed spectral components so that the maximum angular separation among the propagation axes of the spectral components increases.

3. The apparatus of claim 2, wherein the dispersed spectral components diverge at a first maximum angular separation and the one or more optical elements are configured to change at least some of the angles of the propagation axes of the dispersed spectral components so that the dispersed spectral components diverge at a second maximum angular separation larger than the first maximum angular separation.

4. The apparatus of claim 2, wherein the dispersed spectral components diverge at a first maximum angular separation and the one or more optical elements are configured to change at least some of the angles of the propagation axes of the dispersed spectral components so that the dispersed spectral components converge at a second maximum angular separation larger than the first maximum angular separation.

5. The apparatus of claim 1, wherein the first optical element comprises a prism.

6. The apparatus of claim 5, wherein the one or more optical elements are configured to substantially preserve collimation of the dispersed spectral components over a propagation path between the spectrally dispersive element and the single reflective surface.

7. The apparatus of claim 1, wherein the one or more optical elements comprise two lenses having different focal lengths, and wherein the two lenses are separated by a distance that is approximately a sum of the focal lengths.

8. The apparatus of claim 1, wherein the one or more optical elements are configured to change a transverse spatial extent of each of the dispersed spectral components such that a transverse spatial extent of the at least one input beam incident on the spectrally dispersive element is larger than a transverse spatial extent of each of the plurality of dispersed spectral components incident on the reflective surface.

9. The apparatus of claim 8, wherein the transverse spatial extent of the at least one input beam incident on the spectrally dispersive element is larger than the total transverse spatial extent of all dispersed spectral components incident on the reflective surface.

10. The apparatus of claim 8, wherein the transverse spatial extent of the at least one input beam incident on the spectrally dispersive element is at least about two times larger than a transverse spatial extent of each of the plurality of dispersed spectral components incident on the reflective surface.

11. The apparatus of claim 1, wherein the spectrally dispersive element is configured to disperse the spectral components at the different respective angles from a common spatial mode.

12. The apparatus of claim 11, further comprising one or more optical elements configured to expand the at least one the input beam provided to the spectrally dispersive element from a guided spatial mode of a waveguide to a common spatial mode incident on the spectrally dispersive element.

13. The apparatus of claim 12, wherein the single reflective surface receives the plurality of the dispersed spectral components after at least two passes through the one or more optical elements configured to expand the input beam.

14. The apparatus of claim 1, wherein the single reflective surface is configured to receive dispersed spectral components from multiple input beams, and to tilt to select at least one and fewer than all of the received spectral components of a given input beam to be directed to a corresponding selected output path.

15. The apparatus of claim 1, wherein the one or more optical elements are configured to substantially preserve collimation of the dispersed spectral components over a propagation path between the spectrally dispersive element and the single reflective surface.

16. A method for spectrally filtering at least one input beam, comprising:
dispersing spectral components of the at least one input beam at different respective angles in a spectral plane;
changing at least some angles of propagation axes of the dispersed spectral components so that a maximum angular separation among the propagation axes of the dispersed spectral components changes by passing the dispersed spectral components through at least a first optical element having first and second non-parallel surfaces through which the dispersed spectral components pass, with the first optical element substantially preserving collimation of the dispersed spectral components over an entire propagation path between the first and second non-parallel surfaces;
receiving a plurality of the dispersed spectral components incident on a single reflective surface in which central rays of the dispersed spectral components are incident at different points on the single reflective surface; and
tilting the single reflective surface to select at least one and fewer than all of the received spectral components to be directed to a selected output path.

17. A system for monitoring spectra of spectral components of at least one input beam, comprising:
a spectrally dispersive element configured to disperse spectral components of the at least one input beam at different respective angles in a spectral plane;
one or more optical elements, including at least a first optical element having first and second non-parallel surfaces through which the dispersed spectral components pass, configured to change at least some angles of propagation axes of the dispersed spectral components so that the maximum angular separation among the propagation axes of the spectral components changes, with the first optical element configured to substantially preserve collimation of the dispersed spectral components over an entire propagation path between the first and second non-parallel surfaces;
a single reflective surface configured to receive a plurality of the dispersed spectral components in which central rays of the dispersed spectral components are incident at different points on the single reflective surface, and to tilt to select at least one and fewer than all of the received spectral components to be directed to a selected output path; and
at least one detector configured to receive a spectral component directed to a selected output path.

18. An apparatus for spectrally filtering at least one input beam, comprising:
a spectrally dispersive element configured to disperse spectral components of the at least one input beam at different respective angles in a spectral plane;
one or more optical elements configured to change at least some angles of propagation axes of the dispersed spectral components, at least one optical element being located at a distance from the spectrally dispersive element that is less than a focal length of the at least one optical element; and
a single reflective surface configured to receive a plurality of the dispersed spectral components, and to tilt to select at least one and fewer than all of the received spectral components to be directed to a selected output path.

19. The apparatus of claim 18, wherein the single reflective surface is configured to receive a plurality of the dispersed spectral components such that central rays of the dispersed spectral components are incident at different points on the single reflective surface.

20. The apparatus of claim 18, wherein the one or more optical elements comprise two lenses having different focal lengths, and wherein the two lenses are separated by a distance that is approximately a sum of the focal lengths.

21. The apparatus of claim 18, wherein the single reflective surface is configured to receive dispersed spectral components from multiple input beams, and to tilt to select at least one and fewer than all of the received spectral components of a given input beam to be directed to a corresponding selected output path.

22. An apparatus for spectrally filtering at least one input beam, comprising:
a spectrally dispersive element configured to disperse spectral components of the at least one input beam at different respective angles in a spectral plane;
one or more optical elements, including at least a first optical element having first and second non-parallel surfaces through which the dispersed spectral components pass, configured to change at least some angles of propagation axes of the dispersed spectral components so that a maximum angular separation among the propagation axes of the spectral components increases, and to change a transverse spatial extent of each of the spectral components to be smaller than a transverse spatial extent of the at least one input beam incident on the spectrally dispersive element, with the first optical element configured to substantially preserve collimation of the dispersed spectral components over an entire propagation path between the first and second non-parallel surfaces; and
a single reflective surface configured to receive a plurality of the dispersed spectral components, and to tilt to select at least one and fewer than all of the received spectral components to be directed to a selected output path.

23. The apparatus of claim 22, wherein the first optical element comprises a prism.

24. The apparatus of claim 23, wherein the one or more optical elements are configured to substantially preserve collimation of the dispersed spectral components over a propagation path between the spectrally dispersive element and the single reflective surface.

25. The apparatus of claim 22, wherein the one or more optical elements comprise two lenses having different focal lengths separated by a distance that is approximately a sum of the focal lengths.

26. The apparatus of claim 22, wherein the spectrally dispersive element is configured to disperse the spectral components at the different respective angles from a common spatial mode.

27. The apparatus of claim 26, further comprising one or more optical elements configured to expand the at least one input beam provided to the spectrally dispersive element from a guided spatial mode of a waveguide to a common spatial mode incident on the spectrally dispersive element.

28. The apparatus of claim 27, wherein the single reflective surface is positioned to receive the plurality of the dispersed spectral components after at least two passes through the one or more optical elements configured to expand the at least one input beam.

29. The apparatus of claim 22, wherein the one or more optical elements are configured to substantially preserve collimation of the dispersed spectral components over a propagation path between the spectrally dispersive element and the single reflective surface.

* * * * *

UNITED STATES PATENT AND TRADEMARK OFFICE
CERTIFICATE OF CORRECTION

| | | |
|---|---|---|
| PATENT NO. | : 8,284,489 B2 | Page 1 of 1 |
| APPLICATION NO. | : 11/853665 | |
| DATED | : October 9, 2012 | |
| INVENTOR(S) | : Christopher S. Koeppen | |

It is certified that error appears in the above-identified patent and that said Letters Patent is hereby corrected as shown below:

<u>Column 14, claim 9, line 44</u>:

Delete "the total" and insert --a total--

<u>Column 14, claim 12, line 58</u>:

Delete "the input beam" and insert --input beam--

<u>Column 15, claim 17, line 42</u>:

Delete "the maximum" and insert --a maximum--

Signed and Sealed this

Eighth Day of January, 2013

David J. Kappos
*Director of the United States Patent and Trademark Office*